United States Patent [19]

Chen et al.

[11] Patent Number: 5,563,813
[45] Date of Patent: Oct. 8, 1996

[54] AREA/TIME-EFFICIENT MOTION ESTIMATION MICRO CORE

[75] Inventors: Sau-Gee Chen, Hsinchu; Gang-Janp Lin, Taur-Yuan, both of Taiwan

[73] Assignee: Industrial Technology Research Institute, Hsinchu, Taiwan

[21] Appl. No.: 252,564

[22] Filed: Jun. 1, 1994

[51] Int. Cl.$^6$ ........................................................ G06F 7/50
[52] U.S. Cl. ............................................................ 364/715.01
[58] Field of Search ............................... 364/715.01, 768

[56] References Cited

U.S. PATENT DOCUMENTS

| | | | |
|---|---|---|---|
| 4,709,226 | 11/1987 | Christopher | 364/715.01 |
| 4,849,921 | 7/1989 | Yasumoto et al. | 364/768 |
| 4,897,720 | 1/1990 | Wu et al. . | |
| 4,937,666 | 6/1990 | Yang . | |
| 5,040,136 | 8/1991 | Kanoh | 364/715.01 |
| 5,142,360 | 8/1992 | Niihara . | |
| 5,148,386 | 9/1992 | Hori | 364/768 |
| 5,200,820 | 4/1993 | Gharavi . | |
| 5,206,723 | 4/1993 | Parke . | |
| 5,210,605 | 5/1993 | Zaccarin et al. . | |
| 5,305,249 | 4/1994 | Yoshida | 364/768 |

OTHER PUBLICATIONS

Junichi Goto et al., "250–MHz BiCMOS Super–High–Speed Video Processor" (S–VSP) ULSI, IEEE Journal of Solid State Circuits, vol. 26, No. 12, Dec. 1991, pp. 1876–1884.

Kouichi Kikuchi, et al., "A Single–Chip 16–bit 25–ns Real––Time Video/Image Signal Processor", IEEE Journal of Solid State Circuits, vol. 24, No. 6, Dec. 1989, pp. 1662–1667.

L. De Vos et al., "VLSI Architectures for the Full–Search Blockmatching Algorithm", IEEE Journal of Solid State Circuits, 1989, pp. 1687–1690.

Thomas Komarek et al., "Array Architectures for Block Matching Algorithms", IEEE Transactions on Circuits and Systems, vol. 36, No. 10, Oct. 1989, pp. 1301–1308.

Kun–Min Yang et al., "A Family of VLSI Designs for the Motion Compensation Block–Matching Algorithm", IEEE Transactions on Circuits and Systems, vol. 36, No. 10, Oct. 1989, pp. 1317–1325.

"Draft Revision of Recommendation H.261: Video Codec for Audiovisual Services at px64 kbit/s", Elsevier Science Publishers, vol. 2, No. 2, Aug. 1990, pp. 221–239.

Luc DeVos et al., "Parameterizable VLSI Architectures for the Full–Search Block–Matching Algorithm", IEEE Transactions on Circuits and Systems, vol. 36, No. 10, Oct. 1989, pp. 1309–1316.

Primary Examiner—Tan V. Mai
Attorney, Agent, or Firm—Meltzer, Lippe, Goldstein, et al.

[57] ABSTRACT

An efficient micro architecture for motion estimation is proposed. It achieves better time and area performance over the existing structures. Through pipelining and effective manipulation of 2's complement arithmetic, the adder complexity is kept to its lowest, while speed for a combined subtraction, absolution and accumulation operations is made as fast as a carry-save addition (CSA).

7 Claims, 5 Drawing Sheets

TO 1'S COMPLEMENT CIRCUIT 82

FIG. 9

|  | INVENTION | CONVEN-TIONAL | GOTO'S | KIKUCHI'S |
|---|---|---|---|---|
| ADDERS | 2 | 2 | 3 | 2 |
| 1'S COMPL CKTS | 2 | 2 | 2 | 2 |
| SELECTORS | 0 | 2 | 1 | 1 |
| FUNCTIONS | $\|X-Y\|$ $X\pm Y$ | $\|X-Y\|$ $X\pm Y$ | $\|X-Y\|$ $X\pm Y$ | $\|X-Y\|$ |

AREA/TIME-EFFICIENT MOTION ESTIMATION MICRO CORE

FIELD OF THE INVENTION

The present invention relates to an efficient micro architecture for motion estimation. Video encoding demands huge amounts of real-time computation, especially for a motion estimation (ME) operation with full search block matching. For real-time video signal processing, such as HDTV encoding/decoding, to become a reality, design of efficient architecture for motion estimation will be decisive.

BACKGROUND OF THE INVENTION

Figure 1:
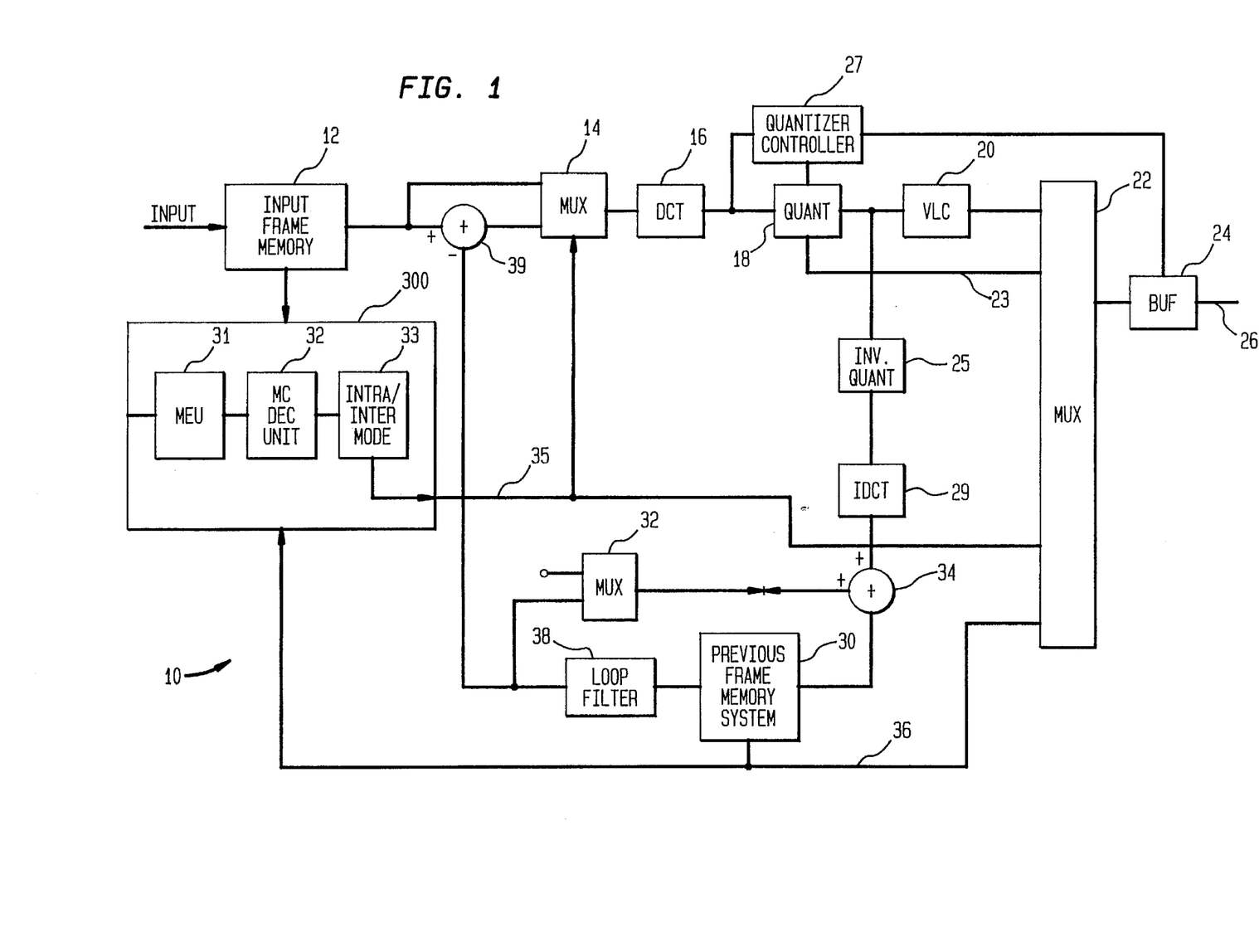
FIG. 1 illustrates a conventional MPEG encoding block diagram.

The amount of data in video signals is huge. A good video signal processing method is needed to encode/decode this data. MPEG is the most popular one. A conventional MPEG encoding system is illustrated in FIG. 1. Among the operations of video signal processing in such a system, motion estimation (ME) is the most time-consuming one. For instance, assuming that the minimum absolute error (MAE) cost function is used and a 16×16 block with a block matching of search range from +M to −M in both spatial directions, then there will be total $512 \times (2M+1)^2$ addition operations for every motion vector generated. On the other hand, the total number of multiplications and additions required for a 16×16 block are about 4096, based on direct row-column matrix multiplication. The time required for Motion Estimation rapidly exceeds the time of Discrete Cosine Transform (DCT) for even moderate M. Note that this comparison does not consider the existence of more efficient DCT algorithms and high memory bandwidth which are required for ME operations. For more efficient encoding, M has to be as large as possible. Consequently, the ultimate bottleneck for real-time video encoding lies in the time-consuming motion estimation operation.

The known architectures for motion estimation in the literature can be divided into two classes. The first class is the ASIC array processor that utilizes regular and repetitive properties of ME operations. The second class is designed by optimizing the data path between different function blocks of general-purpose video signal processors (VSP). This patent adopts the general purpose approach for the consideration of programmability and practical implementation.

The typical video coder, as shown in FIG. 1, contains an input frame memory 12 for storing a current frame of video to be coded. The current frame of video is coded on a block-by-block basis. Some frames are coded in accordance with an intra-mode. In the intra-coding mode, no information from a previous frame is utilized and the coding relies entirely on information contained within the current frame. In the intra-mode, the current frame is divided into N×N pixel blocks, where N=16 for example. Each block of pixels is transmitted from the memory 12, via the multiplexer 14, to the Discrete Cosine Transform (DCT) circuit 16. In the DCT circuit 16, the Discrete Cosine Transform is applied to the block of pixels. The transformed pixels are then thresholded and quantized in the quantizer circuit 18. The quantized, transformed pixels are then coded using the variable length coder (VLC) 20. The variable length coded pixels are then transmitted via the multiplexer 22 to the buffer 24. The coded pixels are then transmitted from the buffer 24 via a channel 26 to a particular destination, where the pixels are decoded. Depending on the contents of the buffer 24, as well as depending on the transformed pixel values, the quantization controller 27 may vary the threshold and quantization stepsize utilized by the quantizer circuit 18. Information as to the threshold and quantization stepsize used to code a particular block is transmitted to the destination via line 23, the multiplexer 22, the buffer 24, and the channel 26.

The output of the quantizer circuit 18 is connected to the inverse quantizer circuit 28 and Inverse Discrete Cosine Transform (IDCT) circuit 29. These two circuits serve to reconstruct a block of pixels coded according to the intra-mode. The reconstructed block of pixels is stored in a previous frame memory system 30. Thus, on a block-by-block basis, the entire current frame, in reconstructed form, is stored in the previous frame memory system 30. This insures that when the next frame is coded, the immediately previously coded frame is always available. Note that when a block of pixels is coded using the intra-mode, the multiplexer 32 outputs zero so the adder 34 adds nothing to the output of the IDCT circuit 29. Thus, the output of the IDCT circuit 29 is connected directly to the previous frame memory system 30, without change. When a frame is coded in the intra-mode, all of the blocks in that frame are coded in the manner described above.

Some frames are coded using a technique known as predictive mode coding. When a frame is coded using the predictive mode, some blocks are coded using the intra-mode described above and some blocks are coded using an inter-mode described below. The inter-mode requires information from both the previous frame and the current frame. For a frame coded using the predictive mode, a decision as to whether to use the inter or intra-mode is made on a block-by-block basis.

The first step in deciding whether to use the intra-mode or the inter-mode for a current block is to first find the best match of the current block in the previous frame. For this purpose the processor circuit 300 is used. The processor circuit 300 contains a Motion Estimation Unit (MEU) 31, a Motion Compensation (MC) Decision Unit 32, and an Inter/Intra Decision Unit 33. The current block of the current frame is transmitted from the input frame memory 12 to the MEU 31. A search window of the previous frame, which previous frame is stored in the previous frame memory system 30, is also transmitted to the MEU circuit 31. The search window of the previous frame includes the pixels of the previous frame which correspond to the pixels of the current block of the current frame as well as additional pixels in each dimension to define a search window.

For example, the search window comprises the pixels in the previous frame which correspond to the 16×16 current block as well as ±7 pixels in each dimension. The error between the 16×16 current block and each possible 16×16 block in the search window is then determined. The error between the current block at each possible 16×16 block in the search window is determined according to the formula $$\text{error} = \sum_{i,j=1}^{16} \{|a(i,j) - b(i-m,j-n)|^p\}$$

where a(i,j) is a pixel from the current block, b(i-m,j-n) is a pixel from a specific block in the search window, and D=m,n is a displacement vector of the specific block in the search window with respect to a zero displacement block in the search window. The block in the search window which results in the minimum error is then determined. The block in the search window which results in the minimum error may be the zero displacement block (D=0,0) or a block which is displaced from the zero displacement block by a motion vector D=m*,n*, where m*,n*, is the value of m,n which results in the minimum error. The zero displacement block (i.e., D=0,0) in the search window is the 16×16 block which has the same location in the previous frame stored in the previous frame memory system 30 as the current block has in the current frame. If D does not equal 0,0, it means that the best match block in the search window is displaced from the zero displacement block by the motion vector m*,n*.

Figure 2:
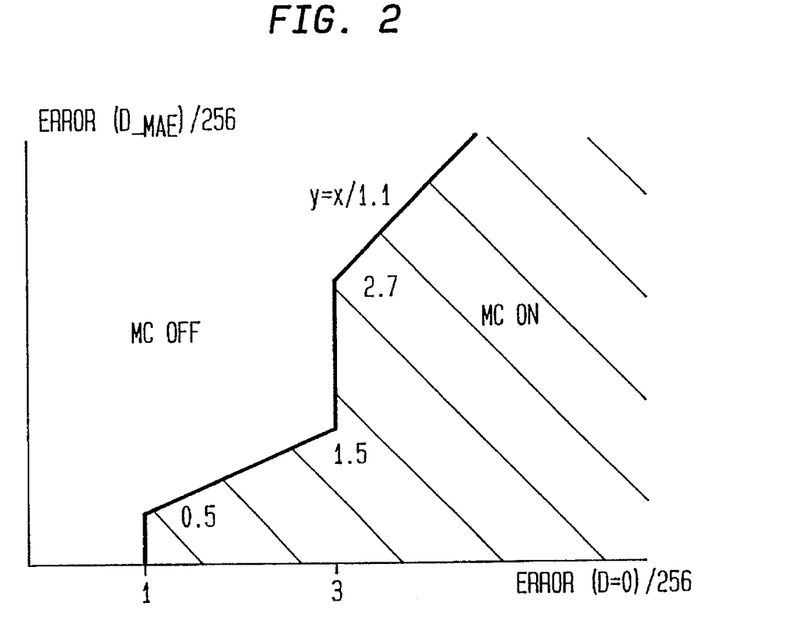
FIG. 2 illustrates the decision whether or not to use motion compensation.

The MC decision unit 32 determines whether or not to use motion compensation for each current block in the current frame. The algorithm used to make the decision may be understood with help of FIG. 2. In FIG. 2, the vertical axis represents possible values of the error between the current block and the block in the search window which results in the minimum error. The horizontal axis represents possible values of the error between the current block and the D=0,0 block in the search window. The actual errors between the current block and the best match and zero displacement blocks of the search window define a point in the graph of FIG. 2. If this point is in the shaded region of FIG. 2 (excluding the decision curve) motion is detected and motion compensation is used for the current block. If the point is outside the shaded region, motion compensation is not used for the current block.

Once it is decided whether or not to use motion compensation for a current block, the Inter/Intra Decision Unit 33 decides whether to use intra-mode or inter-mode coding for the current block. If motion compensation is to be used, then the best match (i.e., minimum error) block of the search window is used for the inter/intra decision. If motion compensation is not used for the current block, then the inter/intra decision is made using the zero displacement block of the search window.

The inter/intra decision is as follows: the variance of the current block and the variance of the error between the current block and the best match or zero displacement block (depending on whether or not there is Motion Compensation) are determined. The variance (VAROR) of the current block is given by $$VAROR = INT \left\{ \frac{sum|a(i,j)|^2}{N^2} - \frac{(sum\ a(i,j))^2}{N^2} \right\}$$

In addition, the variance of the error between current and best match block or zero displacement block is given by $$VAR = INT \left\{ \frac{sum|a(i,j) - b(i,j)|^2}{N^2} \right\}$$

Figure 3:
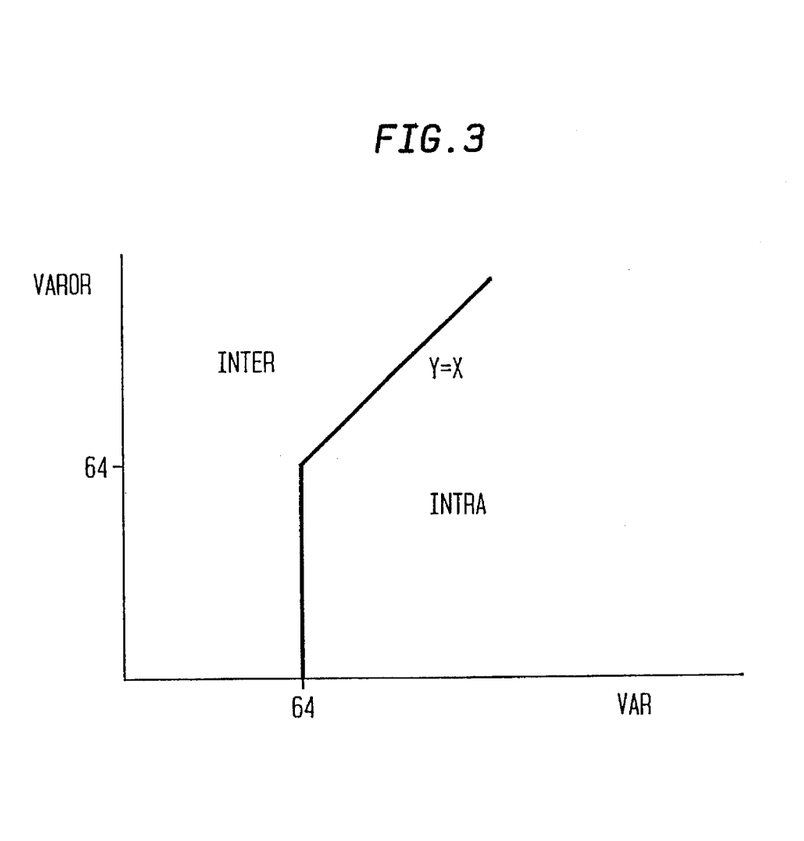
FIG. 3 illustrates whether inter or intra mode coding is utilized.

Depending on the value of VAROR and VAR, inter or intra mode coding is utilized in accordance with FIG. 3.

The decision as to whether to use inter or intra coding is transmitted from the MC circuit to the multiplexer 12 via line 35.

When intra-mode coding for the current block is used, the current block is transmitted from the frame memory 12, via the multiplexer 14, to the DCT circuit 16 and the block is coded directly using the DCT circuit 16, the quantizer 18, and the VLC circuit 20 in the manner discussed above. The inverse quantizer 28 and IDCT circuit 29 are used to reconstruct the block for storage in the previous frame memory 30.

When the inter-mode is used, the best match or zero displacement block (depending on whether or not Motion Compensation is used) from the previous frame is retrieved from the previous frame memory system 30 and is filtered by the loop filter 38, which filter performs a smoothing function. The subtractor 39 is then used to obtain the difference between the current block and best match or zero displacement block from the previous frame. The difference is then transmitted from the subtractor 39, via the multiplexer 14, to the DCT circuit 16. The difference is transformed using the DCT circuit 16. The resulting transform coefficients are then thresholded and quantized using the quantizer circuit 18. The resulting coefficients are coded using the VLC 20 and transmitted via the multiplexer 22, the buffer 24, and the channel 26 to a destination.

The difference is reconstructed using the inverse quantizer 28 and IDCT circuit 29.

When inter-mode coding is used, the output of the filter 38 is transmitted via the multiplexer 33 to the adder 34.

The adder 34 combines the reconstructed difference at the output of the IDCT circuit 29 with the output of the filter 38 to reconstruct the current block. The current block is then stored in the previous frame memory system 30.

There is also transmitted to the destination via line 35, multiplexer 22, buffer 24, and channel 26 an indication of whether inter or intra-mode coding is being used for a block. This indication is also transmitted to the multiplexer 14 so that the multiplexer can determine whether to transmit to the DCT circuit 16, the circuit block from the input frame memory 12 or the difference from the subtractor 39. In addition, there is transmitted to the destination, via line 36, the multiplexer 22, the buffer 24 and the channel 26, the best match displacement vector when motion compensation is being used or an indication that the zero displacement block from the search window is being used.

In a typical application, one frame is entirely intra-mode coded and the alternate frame is coded using a predictive mode in the manner described above.

An ideal ME core is required to efficiently perform various functions, including addition, subtraction, absolution and accumulation operations.

Figure 4:
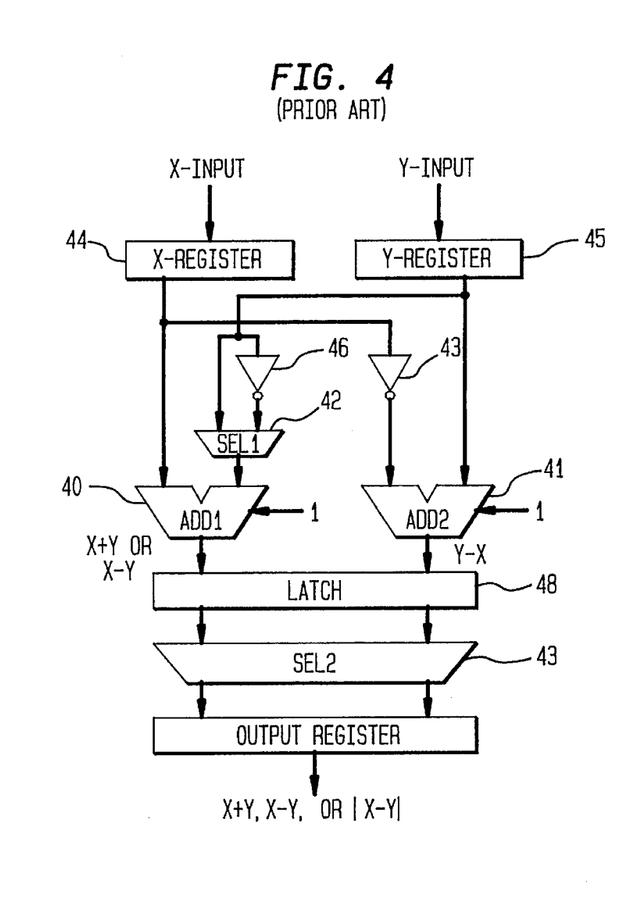
FIG. 4 illustrates a conventional micro structure for motion estimation.

FIG. 4 illustrates a conventional ME core. The structure provides parallel adders 40, 41 for fast calculation of the absolute value. However, this core consumes a great deal of area because it requires two selectors (42,43), two adders (40,41) and two 1's complement circuits (46,47). One of the selectors can be eliminated at the expense of one more adder, as shown in FIG. 5 and disclosed by Goto et al., "250 MHz BiCMOS Super-High-Speed Video Signal Processor," IEEE JSSC, Dec. 1991, pp. 1876–1884.

FIG. 4 represents a conventional circuit for calculating the absolute value of two input signals. This calculation is necessary for motion compensation. The circuit consists of two input registers: X-register 44 and Y-register 45, a carry look ahead (CLA) adder (ADD1) 40 with invertors 46 and a selector (SEL1) 42 for the Y input, a second CLA adder (ADD2) 41 with inverters 47 for the X input, a pipeline register or latch 48 and a second selector (SEL 2) 43. Inputs X and Y are sent to the respective registers (44, 45). The first CLA adder 40 calculates either X+Y or X−Y by selecting Y or the inverse of Y with the selector 42. The X input is sent to inverter 47 so that the second CLA adder 41 always calculates Y−X. The results (X+Y, X−Y, Y−X) are sent to the latch 48 and then to the second selector 43. The second selector (SEL 2) 43 selects X+Y, X−Y and |X−Y| according to instructions. The critical count in first pipelined stage is 16 and the propagation delay time is 4.7 ns. A 250 Mhz operation cannot be realized using the circuit of FIG. 4.

Figure 5:
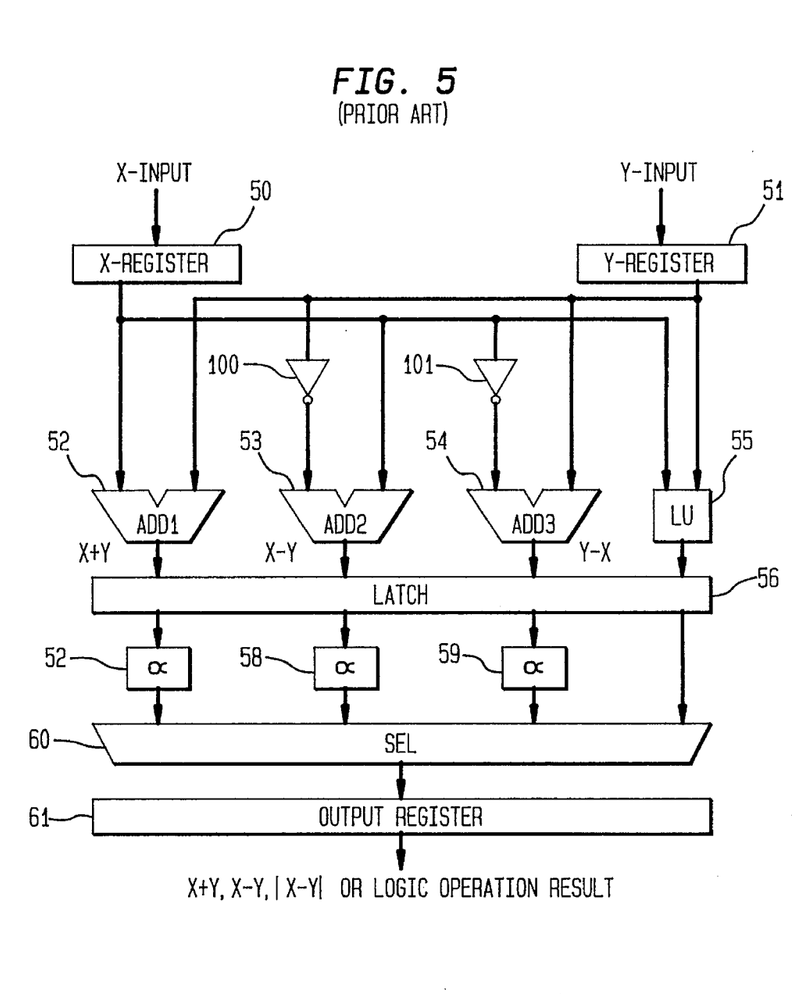
FIG. 5 illustrates a conventional motion estimation core.

The circuit of FIG. 5 was developed to do the calculations in 4 ns and to realize a 250 MHz operation. The circuit includes two input registers (50,51): (X-register and Y-register), three CLA adders (ADD1 52, ADD2 53, and ADD3

54), a logical operation unit (LU) 55, a pipeline register or latch 56, three overflow correctors (OC) 57, 58, 59, one selector (SEL) 60 and an output register 61. The third adder 54 was added so that X+Y and X−Y can be calculated by different adders, and, therefore, the extra selector FIG. 4 can be eliminated. The first adder 52 calculates X+Y from the inputs X and Y. The Y input is sent to inverter 100 before it is input to the second adder. The second adder 53 then calculates X−Y from the X input and inverted Y input. The X input is sent to inverter 101 before it is input to the third adder 54. The third adder then calculates Y−X from the Y input and inverted X input. Inputs X and Y are also sent to the logic unit 55. The results of the three adders and the logic unit are sent to a latch 56. Then X+Y is sent to overflow corrector 57, X−Y is sent to overflow corrector 58, and Y−X is sent to overflow corrector 59. After the signals are corrected for overflow, a selector 60 selects either X+Y, X−Y,|X−Y| or a logic operation result to send to the output register 61. The critical gate count is 14 gate and the carry propagation delay time of three adders is improved. The hardware size for X−Y, X+Y and Y−X has become 1.3 times as large as FIG. 4, the critical path gate count and propagation delay time are reduced.

Figure 6:
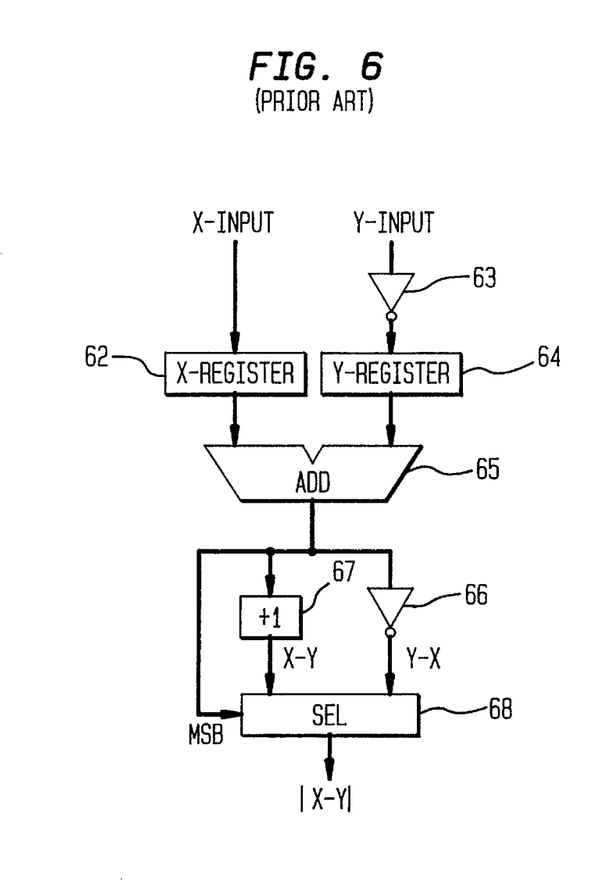
FIG. 6 illustrates a conventional motion estimation core.

Another conventional core is shown in FIG. 6 and disclosed by Kikuchi et al., "A Single-Chip 16-bit 25-ns Real Time Video/Image Signal Processor," IEEE JSSC, Dec. 1989, pp. 1662–1667. FIG. 6 illustrates another known system for calculating the absolute value of two input signals. The circuit includes two registers 62, 64 and one adder (ADD) 65. An inverter 63 is used for the Y-input signal. A second inverter 66 is used to obtain Y−X. An incrementor (+1) 67 is used to increment its input data by plus one and results in X−Y. An absolute value |Y−X| can be selected by the selector (SEL) 68. This circuit reduces hardware size but increases the propagation delay. This core provides relatively efficient hardware for absolute operation only, but it still requires two adders and one selector.

Moreover, all the above mentioned conventional designs do not include an accumulator for obtaining a total sum of these absolute differences. They do not take advantage of the correlation between the adder for absolute value calculation and accumulation.

SUMMARY OF THE INVENTION

In accordance with the present invention, the present ME core can perform motion estimation fast.

Through pipelining and effective manipulation of 2's complement arithmetic, complexity of the micro architecture is kept to its lowest, while time spent for combined subtraction, absolute value and accumulation operations is made as fast as a CSA (carry-save addition). The hardware is reduced and the propagation delay is reduced so that the calculations are less time and space consuming.

DETAILED DESCRIPTION OF THE INVENTION

Figure 7:
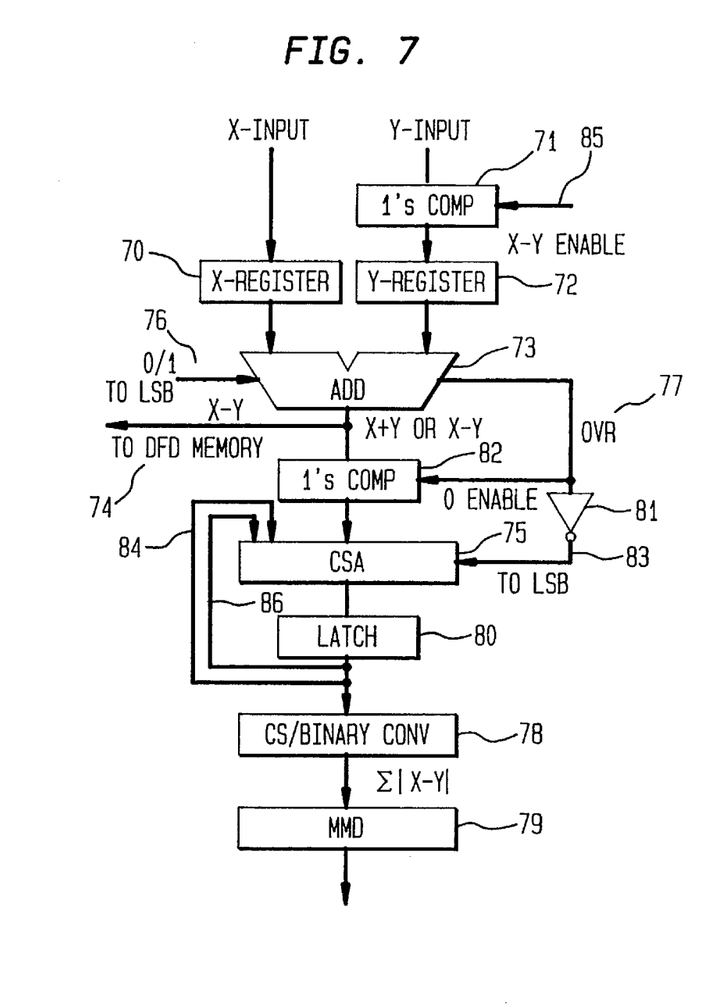
FIG. 7 illustrates a micro core for motion estimation according to the present invention.

FIG. 7 shows the data paths of the inventive motion-estimation (ME) micro-core. The ME core basically comprises two simple adders: a first adder (ADD) 73 and a second adder (CSA) 75. The first adder 73 receives inputs from an X-register 70 and a Y-register 72. The inputs of the registers are the frames stored in the input frame memory 12. The inputs from the registers are 2's complement numbers. The first adder 73 calculates X+Y and X−Y. A carry-in bit 76 is input to the first adder 73. This carry-in bit 76 indicates whether the adder 73 performs an X+Y or X−Y operation. A 1's complement circuit 71 is provided for the Y-register 72. The 1's complement circuit 71 is controlled by control signal 85. This control signal 85 enables or disables the 1's complement circuit 71 depending on whether X+Y or X−Y is desired. If X+Y is desired, the 1's complement circuit 71 is disabled and the carry bit 76 is set to 0 (zero). Then 2's complement addition is performed by the first adder to obtain X+Y. If X−Y is desired, the 1's complement circuit is enabled by control circuit 85. The 1's complement of Y is obtained and the carry-in bit 76 is set to 1. The first adder 73 then adds X, −Y, in 1's complement, and 1 (carry-in bit 76) to obtain X−Y in 2's complement. The X−Y operation is performed for the difference of frame displacement (DFD) 74 and sent to DFD memory (not shown). The X+Y operation is performed for motion compensation.

The absolute value operation |X−Y| for the minimum absolute error (MAE) is not explicitly computed, but is carried out together with the operation $$\sum_{n=1}^{256} |x_n - y_n|$$

in the second adder module 75, which is a carry save adder (CSA), and in the latch 80. Together the second adder 75 and the latch 80 constitute a carry save accumulator. The inventive circuit replaces the conventional slow 2's complement operation for the absolute value of X−Y with the simple 1's complement operation and the addition of 1 to the least significant bit (LSB) 83 in the second adder 75 and to the least significant bit 76 in the first adder 73. An accumulation of absolute values is obtained with the appropriate sign.

The accumulation operates as follows. The first adder 73 obtains either X−Y or X+Y. The first adder 73 generates an output carry signal or overflow bit (OVR) 77 which if equal to 0 (zero) indicates that X−Y is negative. If X−Y is positive, i.e., ≧0, the output of the first adder 73 is sent directly to the second adder 75 for the absolute value accumulation. However, if the OVR=0, the second 1's complement circuit 82 is enabled and the 1's complement of X−Y is obtained. Further, if X−Y<0, the signal OVR 77 is inverted by invertor 81. The inverted OVR signal is then added to the 1's complement of X−Y in the second adder. Thus, the signal going to the second adder 75 is either the result of the first adder or the 1's complement of the result of the first adder. The last input to the second adder 75 is the output of the latch 80. The latch output 80 has two parts: sum bits 84 and carry bits 86. The latch has two inputs from the carry-save adder: a c-word (carry word) input and a s-word (sum word) input. An accumulation of absolute values of X–Y is thereby obtained. After, the accumulation is complete, the converter 78 converts the accumulation from carry save to binary because the output of the accumulation from the latch 80 is in the form of partial sums and carries. This results in the minimum absolute error accumulation for the newly matched block. The converter 78 is preferably a CS/Binary converter.

Since the accumulator (adder 75 and latch 80) is based on carry-save-addition (CSA), it is free of carry-propagation delay. As such, time spent for motion estimation is greatly reduced. The accumulator outputs an absolute error every 256 CSA cycles for a 16×16 block matching. Thus, conversion of the output from CSA to binary is accomplished in the converter 78, which is preferably a simple bit-serial full adder. The conversion is finished in N out of 256 CSA addition cycles for an N-bit binary output. The MMD module 79 updates the minimum absolute error by comparing the current minimum error with the error of the newly matched block, bit serially starting from the most significant bit (MSB). Similarly, MMD module 79 is preferably realized by a bit-serial full adder.

Figure 8:
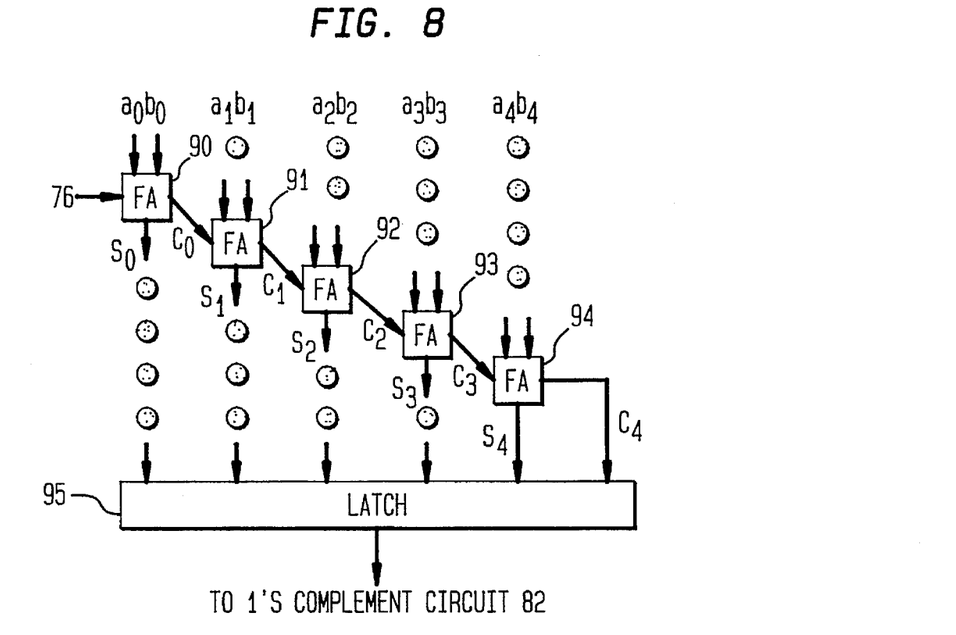
FIG. 8 illustrates a fully pipelined bit parallel adder with 6-bit wordlength according to the present invention.

Due to the repetitive nature of block matching operations, the first adder 73 is preferably a highly pipelined adder. FIG. 8 illustrates a fully pipelined parallel adder realization for the first adder 73. Such an adder comprises N full adders for an N-bit number. In this example N equals 5. Each full adder has three inputs and three outputs. The least significant bits ($a_o,b_o$) of each number to be added are input to the first full adder 90. The carry-in bit 76 is the third input for the first full adder 90. A sum bit $S_0$ is output to a latch 95 and a carry bit $C_0$ is output to the second full adder 91. The other two inputs to the second full adder are $a_1$ and $b_1$. A sum bit $S_1$ is output to the latch 95 and the carry bit $C_1$ is output to the third full adder 92. The other two inputs to the third full adder are $a_2$ and $b_2$. A sum bit $S_2$ is output to the latch 95 and the carry bit $C_2$ is sent to the fourth full adder 93. The other two inputs to the fourth full adder are $a_3$ and $b_3$. A sum bit $S_3$ is output to the latch 95 and the carry bit $C_3$ is sent to the fifth full adder 94. The other two inputs of the fifth full adder are $a_4$ and $b_4$. The sum bit $S_4$ and the carry bit $C_4$ are both sent to the latch. The sum bits ($S_0$ to $S_4$) and the final carry bit $C_4$ are added together. The adder works sequentially. The sum bits arrive at the latch at the same time. Each of the full adders must wait for the previous full adder to complete its addition before proceeding. This is controlled by shift registers as shown by the shaded circles. The shift registers also serve as pipeline registers for pipeline fast addition by the first adder 73. The output of the latch 95 is then transmitted to the second 1's complement circuit 82. The adder's cycle time can be made as short as a CSA time, or as large as a carry-ripple addition time without resorting to CLA or any other fast addition schemes that consume area.

Assuming that one CSA time consumes at most several nano seconds, for example, 4 ns, then a 250 MHz clock rate will be required to exploit the speed advantage. Modest process and circuit design technology may not achieve smooth operation under such speed. Alternatively, we can construct the pipelined adder 73 based on a simple n-bit carry-ripple adder (CPA), instead of the 1-bit full adder. The length of CPA is the one wherein the resulting CPA time best matches the shortest cycle time which the design environment allows and guarantees smooth operation. The benefits of this approach are the reduction of pipeline latches and elimination of a complicated adder.

Figure 9:
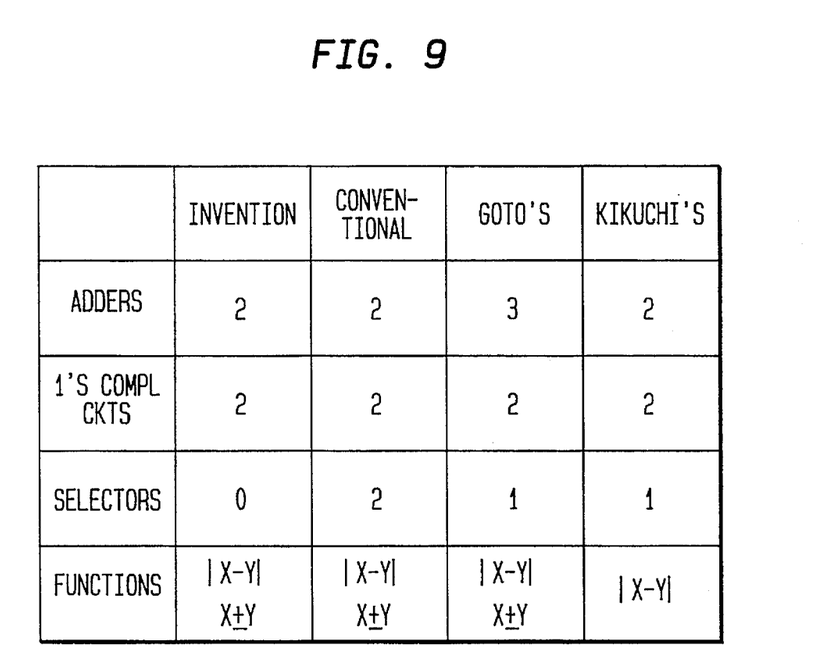
FIG. 9 illustrates a comparison of area complexities of the structure of the present invention and the prior art structures.

FIG. 9 summarizes the occupied area for the inventive and conventional architectures. As shown, the architecture of the present invention has the lowest hardware complexity. Moreover, adders of the whole motion estimation core are simple CSA, CPA adders and bit-serial adders.

Finally, the above-described embodiments of the invention are intended to be illustrative only. Numerous alternative embodiments may be devised by those skilled in the art without departing from the spirit and scope of the following claims.

What is claimed is:

1. A circuit for estimating motion between a signal x from a first frame and a signal y from a second frame comprising:

a first 1's complement circuit receiving y and a control signal, and outputting one of y or the 1's complement of y, depending on said control signal, a first circuit receiving x, the value outputted from said 1's complement circuit, and a carry-in bit, wherein said first circuit outputs the sum of x, said value outputted from said 1's complement circuit, and said carry-in bit, a second 1's complement circuit receiving said value outputted from said first circuit and an overflow bit outputted from said first circuit, and outputting either said value outputted from said first circuit or the complement of said value outputted from said first circuit, depending on said overflow bit, an inverter for outputting the complement of said overflow bit, and a second circuit for adding said signal outputted from said second 1's complement circuit to said complement of said overflow bit, and for accumulating and outputting the sum of said signal outputted from said second 1's complement circuit and said complement of said overflow bit, wherein when said control signal causes said first 1's complement circuit to output said complement of y, said carry-in bit is set to 1 so that said first circuit produces x–y, wherein when said control signal causes said first 1's complement circuit to output y, said carry-in bit is set to 0 so that said first circuit produces x+y, wherein when said first circuit produces x–y, and when said overflow bit causes said second 1's complement circuit to output the complement of x–y, said complement of said overflow bit is set to 1 so that said second circuit produces |x–y|, wherein when said first circuit produces x–y, and when said overflow bit causes said second 1's complement circuit to output x–y, said complement of said overflow bit is set to 0 so that said second circuit produces |x–y|, and wherein said second circuit outputs Σ|x–y|.

2. The motion estimation circuit of claim 1 wherein said first circuit generates a signal (x–y) for calculating a difference of frame displacement, and said first circuit generates a signal (x+y) for motion compensation.

3. The motion estimation circuit of claim 2 wherein said second circuit comprises a carry save adder having an output with two output bits, a latch having an input for receiving said output bits from said carry save adder, and having an output for feeding bits back to said carry save adder, so as to form a carry save accumulator, a CS/Binary converter having an input connected to said output of said latch wherein said CS/Binary converter generates an output Σ|x–y| in binary form.

4. The motion estimation circuit of claim 3 wherein said CS/Binary converter output $\Sigma|x-y|$ represents a minimum absolute prediction error.

5. The motion estimation circuit of claim 4 further comprising:

a module having an input connected to said output of said CS/Binary converter wherein said module updates said minimum absolute error by comparing said error with an error of a newly matched block, and wherein said CS/Binary converter and said module are bit-serial full adders.

6. A method for motion estimation, comprising:

inputting a first number x and a second number y in 2's complement form into an adder circuit, selectively obtaining a 1's complement of said second number $\bar{y}$, selectively producing a difference between said first and second numbers x−y in a single adding operation of an adder by adding said first number x, a first carry-in 1 and said 1's complement of said second number $\bar{y}$, to produce $x+\bar{y}+1$ which equals said difference x−y, or producing a sum x+y if said difference x−y is positive, selectively transmitting said difference x−y to an accumulator circuit, and if said difference x−y is negative, then:

obtaining a 1's complement of said difference $\overline{x-y}$, transmitting said 1's complement of said difference $\overline{x-y}$ to said accumulator circuit, and selectively transmitting a second carry-in 1 to said accumulator.

7. The method of claim 6, further comprising:

adding said first and second numbers to obtain a sum for motion compensation, and subtracting said first and second numbers to obtain a difference for difference of frame displacement.

* * * * *